United States Patent
Neubauer et al.

(10) Patent No.: US 6,299,979 B1
(45) Date of Patent: Oct. 9, 2001

(54) COLOR EFFECT COATING COMPOSITIONS HAVING REFLECTIVE ORGANIC PIGMENTS

(75) Inventors: Christopher M. Neubauer, McCandless Township; Calum H. Munro, Wexford, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/466,294

(22) Filed: Dec. 17, 1999

(51) Int. Cl.$^7$ ............................... B32B 27/08; C08K 5/00
(52) U.S. Cl. ...................... 428/407; 428/411.1; 106/499; 523/206; 524/588; 524/589; 524/601
(58) Field of Search ................................ 428/407, 411.1; 106/499; 523/206; 524/588, 589, 601

(56) References Cited

U.S. PATENT DOCUMENTS

| | | |
|---|---|---|
| 3,711,176 | 1/1973 | Alfrey, Jr. et al. ...................... 350/1 |
| 4,384,070 * | 5/1983 | Gaske et al. . |
| 5,122,905 * | 6/1992 | Wheatley et al. . |
| 5,320,871 * | 6/1994 | Angro et al. . |
| 5,516,820 * | 5/1996 | Babjak et al. . |
| 5,783,120 | 7/1998 | Ouderkirk et al. ................. 264/1.34 |
| 5,786,033 * | 7/1998 | Gast et al. . |
| 5,808,794 | 9/1998 | Weber et al. ......................... 359/487 |
| 5,808,798 | 9/1998 | Weber et al. ......................... 359/583 |
| 5,811,484 * | 9/1998 | Wilfinger et al. . |
| 5,825,542 | 10/1998 | Cobb, Jr. et al. .................... 359/487 |
| 5,828,488 | 10/1998 | Ouderkirk et al. ................. 359/487 |
| 5,882,774 | 3/1999 | Jonza et al. .......................... 428/212 |
| 6,040,009 * | 3/2000 | Marufani et al. . |

OTHER PUBLICATIONS

New Challenges in the Ways of Making Color, Modern Paint and Coatings, Apr. 1999, pp. 32–40.
Angle–Dependent Optical Effects Deriving from Submicron Structures of Films and Pigments, Chemical Reviews, 1999, vol. 99, No. 7, pp. 1963–1981.

* cited by examiner

*Primary Examiner*—Tae H. Yoon
(74) *Attorney, Agent, or Firm*—Dennis G. Millman; William J. Uhl

(57) ABSTRACT

By use of polymeric color effect pigment, comprising a plurality of particles essentially free from metallic material, preferably free from inorganic material, and formed from a large number of layers of polymeric materials whose refractive indices differ from each other, metallic, reflective, or colored appearance is provided to coatings or other polymeric products without the use of relatively dense pigments.

29 Claims, No Drawings

COLOR EFFECT COATING COMPOSITIONS HAVING REFLECTIVE ORGANIC PIGMENTS

BACKGROUND OF THE INVENTION

This invention relates to color effect pigments, and more particularly to the use thereof in coatings to provide a goniochromatic and/or reflective finish. Goniochromaticity is the effect of perceived color varying as the angle of illumination or observation varies.

Goniochromatic or reflective pigments are used, for example, in automotive coatings, decorative coatings, plastics pigmentation, printing inks (security inks in particular), and cosmetics. Their optical effect results from the directional reflection of light from predominantly sheetlike particles that are metallic or that have a refractive index contrast. According to the nature of the pigment particles, the pigments are known as metallic effect pigments (for example, aluminum, zinc, copper or alloys thereof) or interference pigments (for example, based on titanium dioxide-coated mica such as muscovite, phlogopite and biotite).

As a result of the incident light being reflected directionally by the predominantly sheetlike particles, effect pigments that are oriented, for example in a coating, exhibit goniochromaticity; that is, their perceived color (lightness and/or hue and/or chroma) varies with the angle of illumination or observation.

Interference pigments may comprise a single platelike layer, or a multilayer structure. The color perceived is affected by, for example, interference in the thin layer or layers, and optionally also by absorption by a chromophore (an organic moiety that absorbs wavelengths in the visible and/or UV ranges) or a color center. A color center is an electron hole pair that results from a lattice defect in a crystalline solid state material and which absorbs wavelengths in the visible and/or UV ranges. Interference, with or without absorption, results in a multiplicity of hue variations that are dependent on the thickness of the thin layer or layers.

Conventional metallic effect pigments of the type comprised of elemental metal are subject to oxidation. Oxidation is undesirable because it can reduce the reflectivity of the metallic particles, and because it can result in generation of gases within a coating composition that is in the liquid state. The surfaces of the metallic particles are sometimes coated with organic or metal oxide materials or subjected to other treatments in order to reduce the oxidation or to alter the appearance provided by the pigment. However, none of these approaches have been able to stop the oxidation totally, and some of the surface treatments tend to reduce reflectivity of the particles.

Metallic effect pigments are dense compared with many of the materials in which they are used; for example, typical aluminum pigments have a specific gravity of about 2.7 compared with specific gravities in the range of about 0.8 to 1.5 for a typical ink or coating composition. It is therefore a challenge to maintain such pigments uniformly suspended in the compositions.

Other color effect pigments rely upon interference phenomena generated by the presence of one or more thin films to develop high chroma (i.e., purity of color). Available pigments of this type generally use only one to five thin film layers of materials that have high refractive index contrast. Examples of this type are generally known and include, but are not limited to, metal oxide-coated silicatic (including mica) and metallic pigments. Because of the nature of the thin film materials used in these prior art interference pigments, their specific gravities typically exceed about 2.5, often substantially higher.

The difference in density between typical prior art color effect pigments and the liquid media within which they are suspended is undesirable. Although these pigments can be dispersed throughout the lower density medium by various methods known to those skilled in the art, the higher density pigments can settle due to the action of gravity. This settling is undesirable because it results in an inhomogeneous pigment distribution that must be corrected by time-consuming re-dispersion of the pigment.

It would be desirable to have available color effect pigments whose densities are closer to those of the liquid media of the compositions in which they are used. It would also be desirable to enhance the goniochromatic effects and/or the directional, high reflectivity of such pigments.

SUMMARY OF THE INVENTION

The present invention provides color effect pigments (i.e., goniochromatic and/or reflective) with densities approaching that of the organic or aqueous media in which they are dispersed. Additionally, the densities of the pigments of the present invention may be tailored to approximate those of particular media. The specific gravity of a pigment of the present invention can be less than 2.5, preferably less than 2.0, even less than 1.5 or lower if desired. These values coincide with the densities of typical liquid vehicles for coating compositions and inks, both solvent-based and water-based.

In another aspect of the invention, the novel color effect pigments can be provided with enhanced goniochromaticity and/or a high degree of directional reflectivity. Dramatic coloration effects can thereby be achieved in cured or dried coatings or inks, polymers, or other pigmented products.

A further capability of the pigments of this invention is their ability to provide a metallic luster appearance without requiring the presence of metallic particles. Moreover, relatively dense metal oxide films are not required. Included are embodiments that are substantially free of elemental metal. As a result, the problems associated with oxidation of metallic pigments are reduced or avoided.

The color effect pigment of the present invention comprises particles of a multilayer polymeric film having differences in refractive index between adjacent layers of at least 0.003, preferably at least 0.01, most preferably at least 0.05. In particular embodiments, the pigment particles are produced from continuous films in which there are refractive index differences between adjacent, substantially planar layers of polymeric material. The number of layers in such films is much greater than in typical prior art organic or coated reflective pigments, typically in excess of 10 (or 5 adjacent pairs), preferably greater than 50 (25 adjacent pairs). Specific embodiments of film having approximately 100 layers have been found to be particularly useful for producing strong coloration effects in accordance the present invention, but the multilayer film may be provided with much larger numbers of layers. The number of layers and their arrangement within the film can be selected to produce a wide variety of customized coloration effects.

Although pigments or dyes could optionally be used to modify the coloration effects of the polymeric pigments of the present invention, it is another advantage that coloration can be effected without requiring the presence of a visible chromophore, color center, or other visible light absorbing material, thereby avoiding the possibility of color changes over time due to fading.

These multilayer materials in a particulated form suitable for inclusion into paint or other resinous formulations constitute one aspect of the present invention.

Another aspect of the present invention constitutes a coating composition comprising: (a) a film-forming material; and (b) a plurality of particles of the multilayer materials having differences in refractive index between adjacent layers.

The present invention also involves preparation of pigment particles from a multilayer polymeric film that has differences in refractive index between adjacent layers.

DETAILED DESCRIPTION

The polymeric color effect pigment of the present invention comprises particles produced from a multilayer polymeric film in which high reflectivity is achieved by differences in refractive index between a plurality of adjacent layers. The use of a plurality of layers, for example 10 to 1000 layers, enables the development of high reflectivity and/or high chroma even though the layers have a refractive index contrast that is relatively low (typically less than 0.5). Because the layers are polymeric, the pigments made therefrom can be provided with densities that are advantageously in the same range as the coating compositions or other materials to be pigmented, or at least closer to that range than conventional reflective or special effect pigments.

In one embodiment, the polymeric color effect pigments are produced by reducing to small particle size extended films that are prepared from transparent plastics having no visible chromophore, color center or inorganic material. These films are formed from a number of layers of at least two different polymeric materials that differ in refractive index. Adjacent pairs of layers in these films differ in refractive index by at least 0.003 for there to be a perceptible interference effect, more commonly by at least 0.01, and preferably by at least 0.05 if pronounced effects are desired. The layer thicknesses typically range from approximately 0.05 micron to approximately 5 microns for the sake of producing wave interference effects. Such films may be prepared, for example, by the simultaneous extrusion of a plurality of layers of transparent, synthetic, thermoplastic, resinous material while in the thermoplastic state, and subsequently deforming the film in at least one direction to reduce thickness. Preferably, the number of layers is much greater than 10, preferably greater than 50. Specific embodiments of film having approximately 100 layers have been utilized successfully in the present invention, but this type of film may be provided with much larger numbers of layers as may be desired to customize the coloration effects. For use in coatings of conventional thicknesses for automotive coatings, the pigment particles preferably have a thickness no greater than about 10 microns because proper orientation of the particles in the coating becomes difficult with thicker particles.

The number of layers in the multilayer film is selected to achieve the desired optical properties using the minimum number of layers for reasons of film thickness, flexibility and economy. The number of layers usually need not be as high as 10,000, more typically less than 5,000, and in most cases less than 2,000.

Multilayer polymeric films useful in the present invention include those disclosed in U.S. Pat. Nos. 3,711,176 and 5,882,774. The latter patent discloses multilayer films that can be designed to produce reflective films for which the Brewster angle is very large or is nonexistent. This allows for the construction of multilayer high reflectors whose reflectivity for p-polarized light decrease slowly with angle of incidence, are independent of angle of incidence, or increase with angle of incidence away from the normal. As a result, multilayer films having high reflectivity for both s- and p- polarized light over a wide bandwidth, and over a wide range of angles can be achieved.

The average reflectivity at normal incidence for preferred multilayer films is desirably at least 3 percent, preferably at least 10 percent, and can be up to 90 percent and even 100 percent over the bandwidth of interest. Transmission or reflection values given herein include front and back surface reflections. Other multilayer films of the type disclosed in U.S. Pat. No. 5,882,774 can be made to exhibit lower average transmission and/or a larger intended bandwidth and/or reflectivity over a larger range of angles from the normal. If the intended bandwidth is to be centered around one color only, such as red, green or blue, each of which has an effective bandwidth of about 100 nm each, a multilayer film with an average transmission of less than 50% is desirable. Other exemplary preferred multilayer films can be provided with high reflectance over the bandwidth of the visible spectrum (380–700 nm).

The multilayer film may include tens, hundreds or thousands of layers, and each layer can be made from any of a number of different materials. The characteristics that determine the choice of materials for a particular film depend upon the desired optical performance of the film. The film can contain as many materials as there are layers in the film. For ease of manufacture, preferred optical thin films contain only a few different materials.

Several parameters may affect the maximum reflectivity achievable in any multilayer film. These include basic film design, optical absorption, layer thickness control and the relationship between indices of refraction of the layers in the film. Known thin film interference principles can be employed to maximize high reflectivity and/or sharp band edges that yield pure single color appearance. For the optimal effects, this typically involves using optically thin layers, i.e., layers having an optical thickness in the range of 0.1 to 1.0 times the wavelength of the desired color. Thicknesses up to several times the wavelength may be used in other cases where the most vivid effects are not required. The basic building blocks for high reflectivity multilayer films are low/high refractive index adjacent pairs of film layers, wherein each low/high refractive index pair of layers has a combined optical thickness of one half the center wavelength of the band it is designed to reflect. Such films are sometimes referred to as quarterwave stacks.

To minimize optical absorption, the preferred multilayer film ensures that wavelengths that would be most strongly absorbed by the film are the first wavelengths reflected by the film. For most clear optical materials, including most polymers, absorption increases toward the blue end of the visible spectrum. Thus, it is preferred to tune the multilayer film such that the "blue" layers are on the incident side of the multilayer film.

The relationships between the indices of refraction in each film layer to each other and to those of the other layers in the film determine the reflectance behavior of the multilayer film at any angle of incidence. Assuming that all layers of the same material have the same indices, then a single interface of a two component quarterwave stack can be analyzed to understand the behavior of the entire film as a function of angle.

In embodiments of multilayer films made in accordance with the aforesaid U.S. Pat. No. 5,882,774, refractive index differences between layers are enhanced by polymeric orientation by stretching the film in at least one direction in the plane of the film. Adjacent layers in the film may be composed of different polymeric materials whose refractive indices respond differently to stretch orientation. A uniaxially birefringent material is defined as one in which the index of refraction in one direction is different from the indices in the other two directions. One method of creating a uniaxial birefringent system is to biaxially stretch (e.g., stretch along two dimensions) a multilayer film in which at least one of the materials in the film has its index of refraction affected by the stretching process (e.g., the index either increases or decreases). Biaxial stretching of the multilayer film may result in differences between refractive indices of adjoining layers for planes parallel to both axes thus resulting in reflection of light in both planes of polarization. A biaxial birefringent material is defined as one in which the indices of refraction in all three axes are different. A biaxial birefringent system can be made by stretching the multilayer film in one direction. In other words the film is uniaxially stretched.

The desired average transmission for light of each polarization and plane of incidence can vary. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10 to 50 percent, and can cover a bandwidth of anywhere between, for example, 100 nm and 450 nm, depending upon the particular application. For a high efficiency reflector, average transmission along each stretch direction at normal incidence over the visible spectrum (400–700 nm) is desirably less than 10 percent, preferably less than 5 percent, more preferably less than 2 percent, and even more preferably less than 1 percent. It should be understood that although the stretching techniques are advantageous for enhancing the interference effects, stretching of a multilayer film is not essential for achieving the results of the present invention.

With the design considerations established, one of ordinary skill will readily appreciate that a wide variety of materials can be used to form multilayer reflective films that can be employed in the present invention. The desired refractive index relationships can be achieved in a variety of ways, including extruding, any of a number of coating processes known to one skilled in the art, including but not limited to spin coating, or stretching during or after film formation.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof, (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of mirrors include PET/ECDEL, PEN/ECDEL, PEN/sPS, PEN/THV, PEN/co-PET, and PET/sPS, where "co-PET" refers to a copolymer or blend based upon terephthalic acid (as described above), ECDEL is a thermoplastic polyester commercially available from Eastman Chemical Co., and THV is a fluoropolymer commercially available from 3M Co.

The ability to achieve the desired relationships among the various indices of refraction is influenced by the manner in which the multilayer device is prepared. In the case of organic polymers that can be oriented by stretching, the devices are generally prepared by co-extruding the individual polymers to form a multilayer film and then (optionally) orienting the film by stretching at a selected temperature, optionally followed by heat-setting at a selected temperature. Alternatively, the extrusion and orientation steps may be performed simultaneously. In the case of reflective materials, the film may be stretched substantially in two directions (biaxial orientation).

Polymeric pigment particles of the present invention are prepared by subdividing the continuous film finely into particles that can be dispersed readily into a coating composition. Any known severing technique may be employed. These techniques include, but are not limited to, mechanical and/or laser cutting processes and grinding processes.

For producing commercial quantities of the pigment, efficiency would suggest a grinding process, in which case it would be advantageous to select polymers for making the multilayer film that have relatively high glass transition temperatures. Glass transition temperatures above room temperature (e.g., above 25° C.) would be preferred in that case, but the use of chilled grinders would permit use of polymers having glass transition temperatures at or below room temperature.

The size of the polymeric pigment particles produced is not critical per se and can be adapted to the particular application. For automotive coatings, the particles preferably have maximum diameters of about 1 micron to 5 millimeters, more preferably no greater than 3 millimeters, most preferably about 5 microns to 100 microns. Preferably, the particles would have thicknesses of 1 micron to 500 microns, more preferably I micron to 20 microns.

In an embodiment of the present invention, a coating having a metallic luster is produced. The metallic luster coating comprises one or more film forming materials (which will be discussed in detail below) and a plurality of polymeric color effect pigment particles.

In another embodiment of the present invention, a coating having a colored appearance is produced. The colored coating comprises one or more film forming materials (which will be discussed in detail below) and a plurality of polymeric color effect pigment particles.

In yet another embodiment of the present invention, a coating having a perceived color that exhibits goniochromaticity; that is, the perceived color varies with angle of illumination or observation, is produced. The goniochromatic coating comprises one or more film forming materials (which will be discussed in detail below) and a plurality of polymeric color effect pigment particles.

As discussed above, the polymeric color effect pigment is present in the metallic luster and/or colored and/or goniochromatic coating with one or more crosslinkable film-forming materials and, if desired, other additives which will be discussed in detail below.

The type and amount of film-forming material and other components included in the coating composition will depend in part upon the nature of the coating and its method of application. No particular measures have been found necessary to incorporate the pigments of the present invention into typical coating formulations. If desired, for the sake of improved dispersibility, the pigments can first be incorporated into a polymeric vehicle in the form of a paste, optionally aided by the addition of surfactants conventionally used with other types of pigments.

The specific pigment to binder ratio can vary widely so long as it provides the requisite color appearance at the desired film thickness and application solids and will depend upon the particular ingredients employed, the type of substrate, the substrates intended use, as well as such factors as the specific size of the polymeric color effect pigment particles used. On a volume basis, the amount of pigment would usually be similar to that employed with other color effect pigments such as coated micas or natural pearl essence (fishsilver). Although there are no critical limits, the effects may not be perceptible in most applications at pigment concentrations less than 0.5 weight percent, and it would be unusual for a coating to contain more than 50 weight percent of these special effect pigments (the percentages based on total solids content of the coating composition).

The special color effect pigments of the present invention can be used in a wide variety of coating compositions. These include waterborne and solvent-borne liquid coating compositions, powder coating compositions, and powder slurry compositions. They can be used in clear coatings (i.e., those that produce cured films having substantial transparency) or they can be added to other pigments and/or dyes in colored coatings. Functionally, the coatings that may include the pigments of the present invention include primers, basecoats, and topcoats, as well as any one or more of the coatings in a multi-coat combination. Compatibility of the pigments with a variety of polymer types has been observed, and it can be expected that any known film-forming polymer composition used for coatings could be used. Some of the more common families of polymer types used in coatings include polyurethanes, acrylics, alkyds, polyesters, epoxies, siloxanes, polysulfides, and combinations thereof. These are known to be provided in coatings as lacquers, thermoplastic, or thermosetting types of compositions. Thermosetting compositions will further include cross-linking agents such as polyisocyanates, amino-formaldehyde aminoplasts, polyacids, polyanhydrides, and combinations thereof. As used herein, "film-forming" means that the film-forming materials form a self-supporting continuous film on at least a horizontal surface of the substrate upon removal of any solvents or carriers present in the composition or upon curing at ambient or elevated temperature.

The ability of the present invention to provide pigments having densities similar to that of the remainder of coating compositions is particularly advantageous in the electrodeposition coating method. This is because electrodeposition usually involves large tanks of coating composition, and maintaining heavy conventional pigments suspended in such a system usually requires special precautions to be taken. An aqueous electrodepositable coating composition including the polymeric color effect pigment of the present invention can be applied to a surface of a metal substrate by any suitable anionic or cationic electrodeposition process well known to those skilled in the art. Useful electrodepositable coating compositions generally comprise one or more crosslinkable film-forming polymers together with crosslinking compounds. Ionic moieties, such as ammonium or sulfonium groups in the case of cationic electrodeposition, are incorporated into the polymer systems of electrodeposition coatings. A variety of film-forming polymers may be used in electrodeposition coatings; a commonly used system includes film-forming polymers derived from epoxies and blocked isocyanates as the cross-linking material.

Volatile materials that can be included as diluents in the liquid or powder slurry coating compositions include water and/or organic solvents, such as alcohols, ethers and ether alcohols, ketones, esters, aliphatic and alicyclic hydrocarbons, and aromatic hydrocarbons as are commonly employed in the coating industry. Examples of solvents for coatings include aliphatic solvents such as hexane, naphtha, and mineral spirits; aromatic and/or alkylated aromatic solvents such as toluene, xylene, and SOLVESSO 100 (aromatic blend from Exxon Chemicals); alcohols such as ethyl, methyl, n-propyl, isopropyl, n-butyl, isobutyl and amyl alcohol, and m-pyrol; esters such as ethyl acetate, n-butyl acetate, isobutyl acetate and isobutyl isobutyrate; ketones such as acetone, methyl ethyl ketone, methyl isobutyl ketone, diisobutyl ketone, methyl n-amyl ketone, and isophorone, glycol ethers and glycol ether esters such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate.

The coating compositions can further include one or more other additives such as UV absorbers and stabilizers, rheology control agents, surfactants, catalysts, film build additives, fillers, flatting agents, defoamers, microgels, pH control additives, and other pigments. Along with the pigments of the present invention, it may be useful in some cases to also include conventional pigments and dyes. These include micas, iron oxides, carbon black, titanium dioxide, aluminum flakes, bronze flakes, coated mica, nickel flakes, tin flakes, silver flakes, copper flakes and combinations thereof. Other organic coloring agents (i.e., dyes or organic pigments) could also be included. If it is desired to match the specific gravity of the polymeric and solvent components of the coating composition, the pigment content of the composition will have essentially no elemental metal components, and preferably essentially no metal oxide components as well. Optimally, for the sake of specific gravity matching, the pigment content of the composition will consist essentially of organic material, i.e., there will be no intentional reliance on the presence of any inorganic material for color development.

Coated finishes, particularly for automobiles, are often provided by multiple layers of different coatings. An automobile coating may typically include an electrodeposited primer, a primer-surfacer coat, a colored basecoat, and a clear top coat. Additional coating layers may be used for appearance or performance purposes. The pigments of the present invention may be used in one or more of any of these coating layers. For example, the coating that includes the polymeric color effect pigment of the present invention can be an otherwise clear coat, which is applied over a basecoat not containing polymeric color effect pigment but pigmented conventionally (i.e., the so-called "color-plus-clear" composite finish). Either or both of the basecoat and clear coat in this example may be waterborne as is known in the art.

In yet another alternative embodiment, the coating which includes the polymeric color effect pigment can be a basecoat, over which is applied a clearcoat which does not contain polymeric color effect pigment. The components of the basecoat and those of the clearcoat can be any of those discussed above.

In yet another alternative embodiment, the coating which includes the polymeric color effect pigment can be a clearcoat which is applied over a basecoat which also contains polymeric color effect pigment. The components of the basecoat and those of the clearcoat can be any of those discussed above.

In yet another alternative embodiment, the coating which includes the polymeric color effect pigment can be a clearcoat which is applied over a basecoat which does not contain polymeric color effect pigment, and over which is applied a another clearcoat which does not contain polymeric color effect pigment. The components of the basecoat and those of the two clearcoats can be any of those discussed above.

The liquid or powder slurry coatings can be applied to the surface of the substrate by any suitable coating process well known to those skilled in the art, for example by dip coating, direct roll coating, reverse roll coating, curtain coating, spray coating, brush coating, electrodeposition and combinations thereof. Powder coatings are generally applied by electrostatic deposition.

The processing of a multilayered film to provide a color effect pigment and the use, as described above, of this pigment in a coating composition is illustrated in the examples that follow. The following examples are merely illustrative of the invention, and are not intended to be limiting. Unless otherwise indicated, all parts are by weight.

EXAMPLE A

A polymeric color effect pigment was prepared by the mechanical cutting of a multilayer reflective film into particles of approximately 500 to 3000 microns in size. The source of the multilayer reflective film used for the examples was a piece of "ReflectaBow" decorative ribbon sold by Hallmark Cards, Incorporated, Kansas City, Mo. The multilayer film material is produced by Minnesota Mining and Manufacturing Company, St. Paul, Minn. It is believed that this film was comprised of approximately 100 polymeric layers.

EXAMPLE B

A hydroxyl functional acrylic polymer was prepared from the following components:

| Component | Weight (g) |
| --- | --- |
| Dispersion stabilizer[1] | 8.49 |
| Dimethylcocoamine | 0.25 |
| N-Octyl mercaptan | 0.90 |
| Methacrylic acid | 3.20 |
| Methyl methacrylate | 82.81 |
| Glycidyl methacrylate | 4.31 |
| N-Heptane | 62.93 |
| ISOPAR E[2] | 26.75 |
| N-Butyl acrylate | 7.07 |
| Blend of 75% EXXSOL D 3135[3] and 25% UNOCAL SPECIAL NAPHTHOLITE 66/3[4] | 2.72 |
| Toluene | 0.53 |
| Azobis 2,2'-(2-methylbutyronitrile) | 0.61 |

[1]Dispersion stabilizer - an acrylic resin containing approximately 45% methacrylic acid, 11% glycidyl methacrylate, 44% hydroxystearic acid in butyl acetate at 42% solids.
[2]ISOPAR E - an isoparaffinic hydrocarbon from Exxon.
[3]EXXSOL D 3135 is an aromatic solvent blend including naphtha from Exxon Chemicals.
[4]UNOCAL SPECIAL NAPHTHOLITE 66/3 - a petroleum hydrocarbon fraction available from Citgo Petroleum Corporation.

EXAMPLE C

An acrylic polymer was prepared from the following components:

| Component | Weight (g) |
| --- | --- |
| Tertiary dodecane thiol | 0.98 |
| N-Butyl methacrylate | 18.32 |
| Hydroxypropyl acrylate | 39.50 |
| Methyl methacrylate | 0.47 |
| Styrene | 19.77 |
| N-Butyl acrylate | 18.79 |
| Glacial acrylic acid - inhibited | 2.18 |
| SOLVESSO 100[5] | 45.83 |
| Xylene | 44.22 |
| Isobutyl alcohol | 9.95 |
| Azobis 2,2'-(2-methylbutyonitrile) | 5.42 |

[5]SOLVESSO 100 - aromatic hydrocarbon mixture available from Shell Chemical.

EXAMPLE D

A clear film-forming material was prepared by mixing together the following components:

| Component | Weight (g) |
| --- | --- |
| SOLVESSO 100 | 28.90 |
| Xylene | 28.90 |

| Component | Weight (g) |
| --- | --- |
| Methyl amyl ketone | 28.90 |
| TINUVIN 328[6] | 3.47 |
| TINUVIN 900[7] | 3.47 |
| TINUVIN 292[8] | 0.92 |
| Polybutyl acrylate solution[9] | 1.60 |
| Acrylic resin of Example B | 6.52 |
| CYMEL 1130[10] | 104.03 |
| Ethanol | 13.87 |
| Acrylic resin of Example C | 177.54 |
| Dodecyl benzene sulfonic acid solution | 2.06 |

[6]TINUVIN 328 - a substituted benzotriazole UV light stabilizer from Ciba Geigy Corporation.
[7]TINUVIN 900 - a substituted benzotriazole UV light stabilizer from Ciba Geigy Corporation.
[8]TINUVIN 292 - a sterically hindered tertiary amine light stabilizer from Ciba Geigy Corporation.
[9]Polybutyl acrylate solution - a flow control agent having a Mw of about 6700 and Mn of about 2600 in xylene at 62.5% solids.
[10]CYMEL 1130 - fully alkylated mixed methoxy/butoxy function aminoplast resin available from Cytec Industries.

EXAMPLE E

A clear film-forming material containing polymeric color effect pigment was prepared by mixing together the following components:

| Component | Weight (g) |
| --- | --- |
| Polymeric color effect pigment particles of Example A | 0.358 |
| Film-forming material of Example D | 6.00 |

EXAMPLE F

An organic premix was prepared by mixing the following components:

| Component | Weight (g) |
| --- | --- |
| Octanol | 63.2 |
| Ethylene glycol monohexyl ether | 188.0 |
| Byk 031[11] | 9.2 |
| Tinuvin 1130[12] | 17.2 |
| Phosphatized epoxy[13] | 4.7 |
| Cymel ® 327[14] | 127.7 |
| Acylaminomethylene phosphonate | 28.5 |
| 50% Aqueous DMEA | 6.2 |

[11]BYK 031 an emulsion of paraffin-based mineral oils and hydrophobic components used as a defoamer available from Byk Chemie.
[12]12 TINUVIN 1130 - a substituted benzotriazole UV light absorber available from Ciba Geigy Corporation.
[13]Phosphatized epoxy prepared from EPON ® 828, a polyglycidyl ether of Bisphenol A, available from Shell Oil and Chemical Co., reacted with phosphoric acid at an 83:17 weight ratio.
[14]CYMEL ® 327 - a partially methylated melamine resin available from Cytec Industries.

EXAMPLE G

An aqueous, unpigmented coating composition was prepared by mixing the following components:

| Component | Weight (g) |
| --- | --- |
| Organic premix of Example F | 88.9 |
| Latex[15] | 80.2 |
| SHELLSOL ® D25[16] | 11.5 |
| Deionized water | 225.3 |
| Polyurethane/acrylic dispersion | 92.2 |
| Polyacrylic dispersion EPL 6920[18] | 141.1 |
| Ethylene glycol monohexyl ether | 12.7 |
| 50% Aqueous dimethylethanolamine | 2.5 |

[15]Prepared according to U.S. Pat. No. 5,510,148 (Example 1).
[16]SHELLSOL ® D25 - Mineral spirits available from Shell Chemical Company.
[17]The polyurethane/acrylic dispersion was prepared as follows: a polyurethane prepolymer was prepared by blending dimethylolpropionic acid (34.9 parts); DESMODUR ® W methylene-bis-(4-cyclohexyl diisocyanate (140.3 parts, available from Bayer Corp.); DDI 1410 dimer isocyanate (81.3 parts, available from Henkel Corp.); FORMREZ ® 66-56 1,6-hexanediol adipate (199.5 parts available from Witco Corp.); MPEG 2000 methoxy polyethylene glycol (50.3 parts available from Union Carbide, Inc.); dibutyltin dilaurate (0.4 parts); and N-methyl pyrrolidone (130.2 parts) and heated at 90° C. until the NCO equivalent weight reached 1079. The prepolymer was cooled to 35° C. and methyl methacrylate (197.9 parts), butyl acrylate (136.8 parts), and ethylene glycol dimethacrylate (14.0 parts) were added, followed by N,N-dimethylethanolamine (23.2 parts). This mixture was dispersed into deionized water (2372.1 parts) containing diethylenetriamine (18.7 parts) at 40° C. over 20 minutes and was held at 40° C. for 15 minutes. The dispersion was passed through a MICROFLUIDIZER ® emulsifier at 8000 psi and was then heated to 60° C. A solution of ammonium persulfate (1.28 parts) in deionized water (99.4 parts) was slowly added, and the temperature was adjusted to 80° C. and held for 30 minutes. The resulting polymer dispersion had a solids content of approximately 25 percent.
[18]Polyacrylic dispersion EPL 6920 available from Akzo Nobel.

EXAMPLE H

An aqueous coating composition containing polymeric color effect pigment was prepared by mixing together the following components:

| Component | Weight (g) |
| --- | --- |
| Polymeric color effect pigments of Example A | 0.358 |
| Aqueous coating composition of Example G | 6.00 |

EXAMPLE I

A film-forming material containing polymeric color effect pigment was prepared by mixing together the following components:

| Component | Weight (g) |
| --- | --- |
| Polymeric color effect pigment particles of Example A | 0.518 |
| DELTRON ® 2000[19] | 5.00 |

[19]DELTRON ® 2000 is an unpigmented acrylic automotive refinish basecoat available from PPG Industries, Inc.

EXAMPLE J

Aliquots of the film-forming material of Example E were drawn down over a black base coat and over an off-white basecoat. These coatings were flashed at room temperature for 10 minutes, and then baked at 141° C. for 25 minutes. Both coated samples had a very attractive appearance. The coating showed a highly metallic luster over black basecoat, and strong goniochromaticity over the black basecoat and over the off-white basecoat. The observed goniochromaticity is summarized in Table I.

TABLE I

| Basecoat color | Perceived Color Effect | |
|---|---|---|
| | Viewing at normal incidence (θ = 0 degrees)[20] | Viewing at oblique angle (θ = 75 degrees) |
| Black | Copper metallic luster | Green metallic luster |
| Off white | Blue | Violet |

[20]θ is the viewing angle with respect to normal.

EXAMPLE K

Aliquots of the pigmented coating composition material of Example H were drawn down over a solvent-borne polyester-melamine silver primer. These coatings were flashed at ambient conditions for 5 minutes followed by a 5 minute bake at 80° C. for 5 minutes, followed by a 25 minute bake at 141° C. for 25 minutes. The panel had an attractive appearance, appearing coppery when viewed at normal incidence (θ=0 degrees) and bluish-green when viewed at an oblique angle (θ=75 degrees).

EXAMPLE L

Aliquots of the pigmented coating composition material of Example H were drawn down over a solvent-borne polyester-melamine silver primer. These coatings were flashed at ambient conditions for 5 minutes followed by a 5 minute bake at 80° C. for 5 minutes. Aliquots of the unpigmented film forming material of Example D were then drawn down over the top of this coating composition, flashed for 10 minutes at ambient conditions, and baked at 141° C. for 25 minutes. The panel had an attractive appearance, appearing coppery when viewed at normal incidence (θ=0 degrees) and bluish-green when viewed at an oblique angle (θ=75 degrees).

EXAMPLE M

Aliquots of the unpigmented coating composition material of Example G were drawn down over a solvent-borne polyester-melamine silver primer. These coatings were flashed at ambient conditions for 5 minutes followed by a 5 minute bake at 80° C. for 5 minutes. Aliquots of the pigmented film forming material of Example E were then drawn down over the top of this coating composition, flashed for 10 minutes at ambient conditions, and baked at 141° C. for 25 minutes. The panel had an attractive appearance, appearing coppery when viewed at normal incidence (θ=0 degrees) and bluish-green when viewed at an oblique angle (θ=75 degrees).

EXAMPLE N

Aliquots of the pigmented coating composition material of Example H were drawn down over a solvent-borne polyester-melamine silver primer. These coatings were flashed at ambient conditions for 5 minutes followed by a 5 minute bake at 80° C. for 5 minutes. Aliquots of the pigmented film forming material of Example E were then drawn down over the top of this coating composition, flashed for 10 minutes at ambient conditions, and baked at 141° C. for 25 minutes. The panel had an attractive appearance, appearing coppery when viewed at normal incidence (θ=0 degrees) and bluish-green when viewed at an oblique angle (θ=75 degrees).

EXAMPLE O

Aliquots of the unpigmented coating composition material of Example G were drawn down over a solvent-borne polyester-melamine silver primer. These coatings were flashed at ambient conditions for 5 minutes followed by a 5 minute bake at 80° C. for 5 minutes. Aliquots of the pigmented film forming material of Example E were then drawn down over the top of this coating composition, flashed for 10 minutes at ambient conditions, and baked at 141° C. for 25 minutes. Aliquots of the unpigmented film forming material of Example D were then drawn down over the top of this coating composition, flashed for 10 minutes at ambient conditions, and baked at 141° C. for 25 minutes. The panel had an attractive appearance, appearing coppery when viewed at normal incidence (θ=0 degrees) and bluish-green when viewed at an oblique angle (θ=75 degrees).

EXAMPLE P

Aliquots of the pigmented coating composition material of Example H were drawn down over a solvent-borne polyester-melamine silver primer. These coatings were flashed at ambient conditions for 5 minutes followed by a 5 minute bake at 80° C. for 5 minutes. Aliquots of the pigmented film forming material of Example E were then drawn down over the top of this coating composition, flashed for 10 minutes at ambient conditions, and baked at 141° C. for 25 minutes. Aliquots of the unpigmented film forming material of Example D were then drawn down over the top of this coating composition, flashed for 10 minutes at ambient conditions, and baked at 141° C. for 25 minutes. The panel had an attractive appearance, appearing coppery when viewed at normal incidence (θ=0 degrees) and bluish-green when viewed at an oblique angle (θ=75 degrees).

EXAMPLE Q

Aliquots of the pigmented coating composition material of Example H were drawn down over a solvent-borne polyester-melamine silver primer. These coatings were flashed at ambient conditions for 5 minutes followed by a 5 minute bake at 80° C. for 5 minutes. Aliquots of the pigmented film forming material of Example E were then drawn down over the top of this coating composition, flashed for 10 minutes at ambient conditions, and baked at 141 °C. for 25 minutes. Aliquots of the pigmented film forming material of Example E were then drawn down over the top of this coating composition, flashed for 10 minutes at ambient conditions, and baked at 141 ° C. for 25 minutes. The panel had an attractive appearance, appearing coppery when viewed at normal incidence (θ=0 degrees) and bluish-green when viewed at an oblique angle (θ=75 degrees).

EXAMPLE R

A strip of the "Reflectabow" material described in Example A was placed on a panel covered with a solvent-borne polyester-melamine silver primer using Super Glue. This strip was approximately 110 mm by 12.5 mm. Aliquots of the unpigmented film forming material of Example D were then drawn down over the top of this coating composition, flashed for 10 minutes at ambient conditions, and baked at 141 °C. for 25 minutes. The panel had an attractive appearance, appearing coppery when viewed at normal incidence (θ=0 degrees) and bluish-green when viewed at an oblique angle (θ=75 degrees).

EXAMPLE S

Aliquots of the film-forming material of Example I were drawn down over a black primer and over a gray primer.

These coatings were dried at 55° C. for 25 minutes. Both coated samples had a very attractive appearance. The coating showed a highly metallic luster over black primer, and strong goniochromaticity over the black primer and over the Grey primer. The goniochromaticity of the resultant coating is summarized in Table II.

TABLE II

| | Perceived Color Effect | |
|---|---|---|
| Primer color | Viewing at normal incidence ($\theta^{11}$ = 0 degrees) | Viewing at oblique angle ($\theta^{11}$ = 75 degrees) |
| Black | Copper metallic luster | Green metallic luster |
| Grey | Blue | Violet |

Although specific embodiments of the invention have been described in detail for the purpose of illustrating the best mode of the invention, it is to be understood that such detail is solely for that purpose and that variations and modification as would be apparent to those skilled in the art are within the spirit and scope of the invention as defined by the claims.

It should be understood that changes can be made to the embodiments described above within the knowledge of those of skill in the art without departing from the spirit and scope of the invention as defined by the claims that follow.

What is claimed is:

1. Polymeric color effect pigment comprising: a plurality of particles whose average maximum dimension is no greater than 5 millimeters, said particles being essentially free from inorganic material, said particles comprising a plurality of layers of thermoplastic organic materials including at least five adjacent pairs of layers whose refractive indices differ from each other by at least 0.003.

2. The pigment of claim 1 wherein said particles comprise at least 25 of said adjacent pairs of layers.

3. The pigment of claim 1 wherein the refractive indices of said adjacent pairs of layers differ by at least 0.01.

4. The pigment of claim 1 wherein the refractive indices of said adjacent pairs of layers differ by at least 0.05.

5. The pigment of claim 1 wherein the average maximum particle dimension is no greater than 3 millimeters.

6. The pigment of claim 1 wherein the average particle dimensions are in the range of 5 microns to 100 microns.

7. The pigment of claim 1 wherein the average specific gravity of the particles is less than 2.5.

8. The pigment of claim 1 wherein the average specific gravity of the particles is less than 2.0.

9. The pigment of claim 1 wherein the average specific gravity of the particles is less than 1.5.

10. The pigment composition of claim 1 wherein the plurality of layers are varied in thickness.

11. The pigment composition of claim 1 characterized by the essential absence of visible chromophore or color centers.

12. Polymeric color effect pigment comprising: a plurality of particles whose average maximum dimension is no greater than 5 millimeters, the average specific gravity of the particles being less than 2.5, said particles comprising a plurality of layers of thermoplastic organic materials including adjacent pairs of layers whose refractive indices differ from each other by at least 0.003.

13. The pigment of claim 12 wherein the average specific gravity of the particles is less than 2.0.

14. The pigment of claim 12 wherein the average specific gravity of the particles is less than 1.5.

15. The pigment of claim 12 wherein said particles comprise least 5 of said adjacent pairs of layers.

16. The pigment of claim 12 wherein said particles comprise least 25 of said adjacent pairs of layers.

17. The pigment of claim 12 wherein the refractive indices of said adjacent pairs of layers differ by at least 0.01.

18. The pigment of claim 12 wherein the refractive indices of said adjacent pairs of layers differ by at least 0.05.

19. The pigment of claim 12 wherein the average maximum particle dimension is no greater than 3 millimeters.

20. The pigment of claim 12 wherein the average particle dimensions are in the range of 5 microns to 100 microns.

21. A coating composition comprising:
   a film-forming component; and
   a pigment component comprising a plurality of polymeric particles whose average maximum dimension is no greater than 5 millimeters, said particles being essentially free from inorganic material, said particles comprising a plurality of layers of thermoplastic organic materials including at least five adjacent pairs of layers who refractive indices differ from each other by at least 0.003.

22. The coating composition of claim 21 wherein the pigment component is adapted to provide a metallic appearance to a cured coating film produced from the coating composition, and the composition is essentially free from elemental metal.

23. The coating composition of claim 21 wherein the pigment component is adapted to provide a colored appearance to a cured coating film produced from the coating composition, and the composition is essentially free from chromophore or color centers.

24. The coating composition of claim 21 wherein the pigment component is adapted to provide a goniochromatic effect to a cured coating film produced from the coating composition and the composition is essentially free from inorganic material.

25. The coating composition of claim 21 wherein the pigment component includes a second color-affecting material different from said particles.

26. The coating composition of claim 25 wherein the second color-affecting material comprises inorganic material.

27. The coating composition of claim 25 wherein the second color-affecting material comprises organic material.

28. The coating composition of claim 21 wherein the pigment content of the composition consists essentially of said layered organic pigment.

29. The coating composition of claim 21 wherein the film-forming organic component comprises a polymeric material selected from the group consisting of urethanes, acrylics, alkyds, esters, siloxanes, sulfides, and epoxies.

* * * * *